United States Patent Office 3,200,136
Patented Aug. 10, 1965

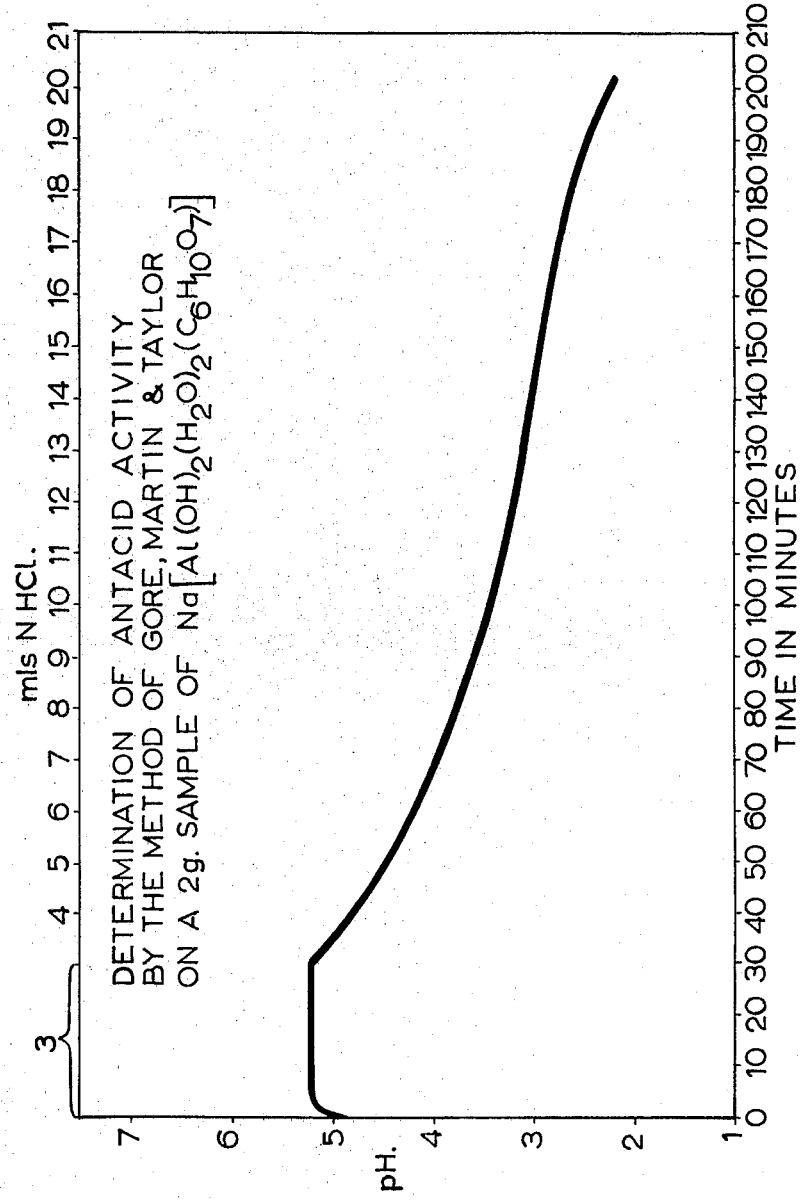

3,200,136
METAL CHELATES OF ALPHA-HYDROXY-CAR-
BOXYLIC ACIDS AND THEIR PREPARATION
Frederick Grossmith, Pinner, Middlesex, England, assignor to Beecham Research Laboratories Limited, Brentford, Middlesex, England
Filed July 9, 1963, Ser. No. 293,763
21 Claims. (Cl. 260—439)

This application is a continuation-in-part of my prior co-pending applications, Serial Nos. 47,371, filed August 4, 1960, and 195,675, filed May 16, 1962, both of which are now abandoned.

This invention relates to pharmaceutical compositions and is particularly concerned with new chemical compounds consisting of chelate complexes of alpha-hydroxy acids with magnesium and other metals.

It is known to produce in the cold or with cooling complex aluminum compounds of certain hydroxy carboxylic acids useful as tanning agents for hides and skins and as finishing agents for chrome tanned leather due to their astringent and protein precipitating properties. These compounds are 100 percent basic aluminum salts having the probable structural formula:

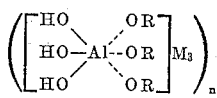

in which one R, two adjacent R's or all three R's signify the acyl radical of certain monocarboxylic, dicarboxylic and tricarboxylic alpha-hydroxy acids, respectively, M is a strong base and $n$ is 1 or 2, and are transitional compounds which age gradually in the cold and rapidly when heated. They are not chelates, do not involve the hydroxyl proton and contain no hydroxo groups. They, therefore, differ both empirically and structurally as well as in properties and uses from the present invention. These known compounds can be represented as $Na_3[Al(AOH)_3(OH)_3]$ wherein AOH is the monodentate acyl radical and in which the aluminum has the acceptable coordination number 6, but not as $Na_3[Al(AO)_3 3H_2O]$ which would require the unknown coordination number 9 since it would be necessary to include three aquo groups.

It is an object of the present invention to provide new chelate complexes of alpha-hydroxy acids with various metals, which complexes are of value inter alia in novel preparations of use in treating iron deficiency conditions in humans and growing crops.

It is a particular object of the present invention to provide novel non-astringent chelate complexes containing aluminum that may be used to combat gastric hyperacidity.

Accordingly, the present invention provides new compounds of the formula:

$$M_x[M'_y(AO)_z(OH)_{lx+y(m-2z)}(H_2O)_v]_n$$

wherein M is selected from the group consisting of magnesium, aluminum, iron, sodium, potassium and the ammonium radical, M' is selected from the group consisting of magnesium, aluminum and iron, AO is selected from the group consisting of the bidentate ions formed from the monocarboxylic alpha-hydroxy acids of the formula:

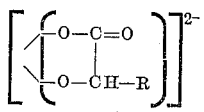

in which R is one of the groups $CH_3$ and $C_4H_9O_4$, and the tetradentate ions formed from tartaric and citric acids of the respective formulae:

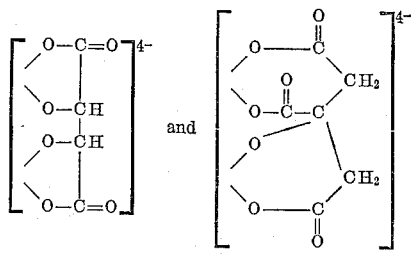

$x$ is an integer from 1 to 5 inclusive, $y$ is unity for bidentate ions and 2 for tetradentate ions, $z$ is an integer from 1 to 4 inclusive, $n$ is 2 for bidentate ions when the valency of M is greater than 1 and is unity in all other cases, $l$ is the valency of M divided by $n$, $m$ is the valency of M' and $v$ is an integer from 0 to 6 inclusive.

The invention also provides a process for the preparation of such compounds, which comprises dissolving stoichiometric amounts of a compound selected from the group consisting of the chloride and sulfate of the metal M and an α-hydroxy acid selected from the group consisting of citric, tartaric, lactic and gluconic acids providing chelated α-hydroxy acid ions in water and slowly adding thereto the stoichiometric amount of an alkali hydroxide.

The invention also provides a further method for their preparation which comprises precipitating at least compounds selected from the group consisting of the hydroxides, carbonates and oxides of the metal M, washing the precipitate to free soluble salts and dissolving the precipitate in the stoichiometric amount of an α-hydroxy acid selected from the group consisting of citric, tartaric, lactic and gluconic acids providing chelated α-hydroxy acid ions.

One series of compounds falling within the scope of the present invention are the magnesium citrate aluminates. These compounds have the general formula:

$$Mg_n[Al_2(OH)_{2n-2} \cdot Ci_2]$$

where Ci is the citrate ion in chelated form and $n$ is an integer from 1 to 5.

The series of compounds is as follows:

(1) $Mg[Al_2Ci_2]$—Magnesium bis citratodialuminate III.
(2) $Mg_2[Al_2(OH)_2Ci_2]$—Dimagnesium bis citratodihydroxodialuminate III.
(3) $Mg_3[Al_2(OH)_4Ci_2]$—Trimagnesium bis citratotetrahydroxodialuminate III.
(4) $Mg_4[Al_2(OH)_6Ci_2]$—Tetramagnesium bis citratohexahydroxodialuminate III.
(5) $Mg_5[Al_2(OH)_8Ci_2]$—Pentamagnesium bis citratooctahydroxodialuminate III.

The first three members of this series are soluble granular compounds which are of value as soluble buffer antacids for the treatment of gastric hyperacidity. Member 4 forms a solution which is unstable, breaking down into a soluble compound and an insoluble one. Member 5 is insoluble. Member 1 compound is a chelated citratoaluminate, while Members 2 to 5 are chelated hydroxo citratoaluminates.

An analogous series of iron III compounds has the general formula:

$$Mg_n[Fe_2^{III}(OH)_{2n-2} \cdot Ci_2]$$

where Ci is the citrate ion in chelated form and $n$ is an integer from 1 to 5.

In this series, iron III has the coordination No. 8 as is evident from the existence of Member No. 5. It is probable therefore that the lower members contain aquo groups to complete the shells. The existence of alkali metal hydroxo ferrates in which iron III has the coordination No. 8 is known, for example, in the following compounds:

$$Na_5[Fe(OH)_8]5-6H_2O$$
$$Na_4[Fe(OH)_7H_2O]1-2H_2O$$

The first member of the series of magnesium iron citrate compounds indicated by the general formula above is a chelated citrato ferrate III, while Members 2 to 5 are chelated hydroxo citratoferrates. Again, Members 1 to 3 are soluble compounds which have value as buffer haematinic compounds for the treatment of iron deficiency.

There is also an increasing recognition of the role of serum magnesium deficiency in the aetiology of human disease. In the cases of iron deficiency associated with magnesium depletion the administration of iron in combination with magnesium may be especially valuable.

The use of iron chelate compounds for the treatment of iron deficiency in growing crops is well known but some of the chelate compounds tried are ineffective in alkaline soils. Some of the compounds of the present invention exhibit good stability in alkaline media and are suitable for correcting iron deficiency in growing plants, especially in alkaline soils.

A further novel compound of the present invention is:

$Al_2[Al_2(OH)_4Ci_2]$—Dialuminum bis citratotetrahydroxodialuminate III.

A solution of this compound, when first passed through an anionic exchange resin column and then through a cationic (H form) exchange resin column, is found to contain c. 25% of the compound in the solution leaving the second column. This indicates that in solution this compound is partly in non-ionized form.

A further series of compounds of the present invention are the magnesium gluconato aluminates III having the general formula:

$$Mg_n[Al_2(OH)_{2n-2}(C_6H_{10}O_7)_4]$$

where $n$ is an integer from 1 to 5.

These water-soluble compounds are especially valuable as buffer antacids as they have excellent acid neutralizing capacities and do not raise the gastric juice to an alkaline pH even when taken in overdosage.

Still further compounds of the present invention are:

$Mg_2[Mg_2Ci_2]$—Dimagnesium bis citratodimagnesate II.
$Mg_2[Fe_2Ci_2]$—Dimagnesium bis citratodiferrate II.
$Fe_2[Fe_2Ci_2]$—Diferrous bis citratodiferrate II.

Brintzinger has established the existence of the binuclear form of the hydroxoaluminate ion. In the case of the present soluble compounds, estimations of molecular weights by cryoscopic methods support a dimeric structure and certainly establish that the compounds are not monomeric. The mechanism of the reaction which takes place to form the compounds of the present invention may be explained as follows:

Citric acid is a tribasic acid but under suitable conditions and with appropriate metal ions, it functions as a tetrabasic acid. When this occurs it is because the hydrogen of the hydroxy group has been displaced with chelate formation. This chelate formation gives rise to two rings, one being six membered and one seven membered.

This may give rise to non-ionized compounds of the type of dialuminum bis citratotetrahydroxodialuminate III already referred to. The structure of such a compound is as follows:

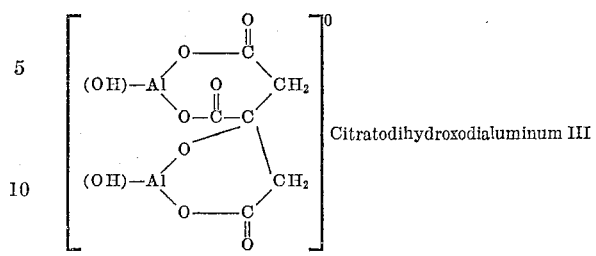

Citratodihydroxodialuminum III

If another pair of rings form on the same metal, a complex anion arises; thus the complex anion so formed with the ions of a divalent metal "M'" has the structural formula:

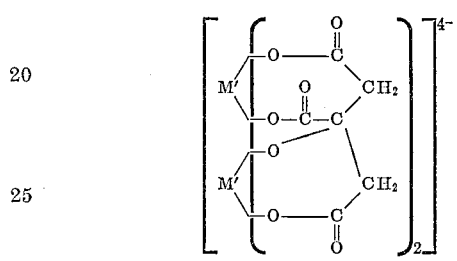

With further metal ions, for example, from a divalent metal "M" (which may be the same or a different metal from "M'"), the following compound is formed:

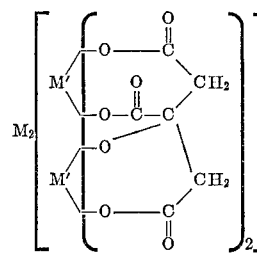

The metal "M" may be magnesium.

If "M'" is trivalent, e.g. iron III or aluminum III, the cation would be formed from one atom only of the divalent metal "M'." With additional cations "M" and hydroxyl ions compounds of the following type would be formed:

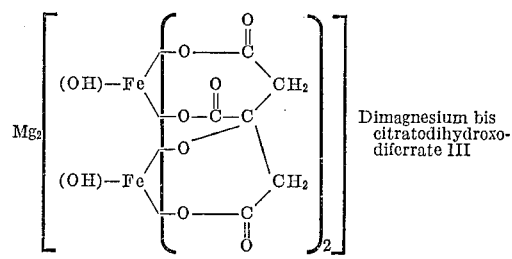

Dimagnesium bis citratodihydroxodiferrate III

It is probable that the molecule includes aquo groups which are not shown.

In addition to citric acid, tartaric acid also chelates giving rise to two rings while monocarboxylic α-hydroxy acids give rise to one ring on chelation.

The compounds of the present invention can in many instances readily be made by simply dissolving stoichiometric amounts of the appropriate chlorides or sulfates and the α-hydroxy acid or a salt thereof in water slowly adding the stoichiometric amount of an alkali hydroxide, e.g. sodium hydroxide, to complete the reaction, e.g.

$$3MgCl_2+2AlCl_3+2Na_3Cit+6NaOH$$
$$=Mg_3[Al_2(OH)_4Ci_2]+12NaCl+2H_2O$$

Such compounds are formed in admixture with the alkali metal salt impurity and for certain applications they can be used in this form without purification.

The pure compounds may be prepared by precipitating the hydroxides or carbonates of the metal or metals required, washing the precipitate free from the soluble salts and dissolving the precipitate in the stoichiometric amount of the α-hydroxy acid. In some cases, the hydroxides are more readily soluble in the required amounts than the carbonates and vice-versa, while in some instances one or more of the metal hydroxides or carbonates are replaced by the corresponding oxide. Coprecipitates formed from mixed salts solutions are generally more readily soluble than the separately precipitated hydroxides or carbonates. In the case of α-hydroxy acid chelate compounds of magnesium and aluminum, a magnesium hydroxoaluminate may be employed for dissolution in the stoichiometric amount of α-hydroxy acid. The solutions of the chelate compounds may be concentrated by evaporation on a water bath or in a steam jacketed vessel, and crystallization may be completed with advantage under vacuum.

In forming coprecipitates from solutions of magnesium and aluminum salts or from solutions of magnesium and iron salts by the use of sodium hydroxide or sodium carbonate, the inclusion of ammonium hydroxide or ammonium chloride gives coprecipitates which are less gelatinous and more readily soluble.

It will be understood that in the case of iron II precipitates, it is necessary to maintain an inert atmosphere, for example, of nitrogen, over the material during precipitation and washing to avoid oxidation.

In preparing the α-hydroxy acid ferrate II or ferrate III compounds the corresponding alkali metal hydroxo ferrate II or III compounds may be first prepared and a solution of the salt of the cation metal added to precipitate the required ferrate (where this is insoluble) prior to dissolution in the α-hydroxy acid.

When magnesium or magnesium-iron chelates are required the mixed carbonates may often be readily dissolved in the α-hydroxy acid under pressure of the carbon dioxide generated, the magnesium bicarbonate formed subsequently breaking down with loss of carbon dioxide during suitable conditions of evaporation and crystallization.

One group of compounds according to the present invention are of particular value as antacids for the treatment of gastric hyperacidity.

In hospital practice the technique of the intraoesophageal milk alkali drip has been employed in the treatment of gastric and duodenal ulcer and their associated gastric hyperacidity. Duodenal ulcer patients generally secrete large quantities of highly acid gastric juice both by day and by night, and the relief of this condition requires frequent intermittent dosage with antacids or the semi-continuous sucking of tablets to simulate drip therapy. The administration of antacids intermittently calls for the use of buffer antacids in order to avoid raising the gastric contents to non-physiological pH values, especially under conditions of overdosage. Not all patients respond well to a regime of continuous sucking of tablets and there is therefore a demand for liquid buffer antacids for use in the home as well as in hospital practice.

Hitherto various preparations have been used, for example, aluminum hydroxide gel preparations and other preparations such as aluminum phosphate gel and magnesium trisilicate gel, alone or as mixtures. All such preparations are suspensions of insoluble substances and are generally of unattractive flavor and texture. Aluminum hydroxide gel is frequently very astringent to the oral mucosa and has a flocculent texture.

The minimum requires for an antacid compound capable of being used in a clear liquid buffer antacid would include a high degree of solubility associated with a good acid-consuming capacity to permit an effective dose of antacid in a reasonable bulk of product. In addition, the effective dose would desirably buffer in the preferred physiological pH range of 5 to 3. Further, the product would have to be reasonably palatable. Certain compounds of the present invention have been found to have properties that make them suitable for use in such products.

The compounds have the general formula:

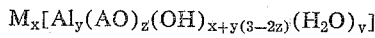

wherein M is sodium or potassium, AO is either the bidentate ion formed from a monocarboxylic α-hydroxy acid of the formula:

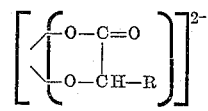

in which R is $CH_3$ (lactic acid) or $C_4H_9O_4$ (gluconic acid) or AO is the tetradentate ion formed from the dihydroxydicarboxylic acid tartaric acid of the formula:

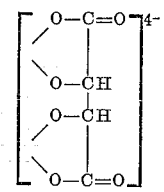

or the tetradentate ion formed from the monohydroxy tricarboxylic acid citric acid of the formula:

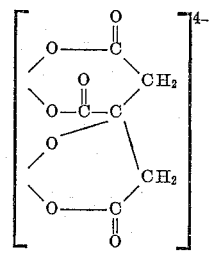

$y$ is 1 for bidentate ions and 2 for tetradentate ions, $x$ is an integer from 1 to 5, $v$ is 0 or an integer from 1 to 6 and $z$ is an integer from 1 to 4, and polymeric forms thereof.

These compounds may in some instances be prepared by dissolving aluminum hydroxide in the α-hydroxy acid in aqueous solution and adding thereto an alkali metal hydroxide. The aluminum hydroxide is preferably freshly prepared by precipitation from a solution of an aluminum salt by means of, for example, ammonium hydroxide. The aluminum hydroxide may be replaced by aluminum isopropoxide. In another method alkali metal aluminate is reacted with the α-hydroxy acid in aqueous solution. The compounds produced depend on the stoichiometric proportions of the reactants.

Two or more α-hydroxy acids may be used in these methods to give products consisting of mixtures of the compounds of the present invention.

The compounds described belong to the category of metal chelates and hydroxo metal chelates (chelated hydroxoaluminates). In the hydroxo metal chelates, both ligand and hydroxyl ions are coordinated to the metal. When the formation of a metal chelate only causes the partial displacement of the water molecules which are coordinated to the metal ion, then hydroxo chelate formation takes place as a result of the neutralization of protons from coordinated water molecules.

It will be seen that this view derives from the conception of the metal ion as a "water complex." The modern view of the transition from the positive aluminum ion to the negative aluminate ion regards the positive aluminum ion as a "water complex" in which six water molecules are coordinated to the metal ion in an octahedral arrangement. The stepwise removal of protons from the water molecules gives rise to a series of hydroxo complexes. The process of olation whereby hydroxyl ions act as bridges between aluminum ions, leads to the formation of polynuclear structures.

As indicated above, the formation of chelated hydroxoaluminates is regarded as a stepwise process in a chelated aluminate where the coordinate covalencies of the aluminum are not saturated. The formation of such compounds and their formulae may be investigated, for example, by potentiometric titrations and other methods, including cryoscopic estimations of molecular weights.

In the present instance potentiometric titrations of varied ratios of gluconic acid and aluminum ions by sodium hydroxide indicate the existence of several series of compounds coming within the scope of the general formula. It is of interest to note that the potentiometric titrations for certain ratios of acid to aluminum ions indicate that 8 moles of base per mole of aluminum ion are required to saturate the coordination valencies of the latter. This result is identical with that found for the magnesium hydroxoaluminates when a solution containing aluminum ions and an excess of magnesium ions in the presence of ammonium chloride is titrated with sodium hydroxide.

As in the present titrations (as distinct from the formation of magnesium hydroxoaluminates) the aluminum remains in solution throughout the whole pH range covered, complex formation is clearly revealed and the presence of 8 coordinate aluminum in these series of chelated hydroxoaluminates is indicated.

That the compounds are chelated aluminates and hydroxoaluminates is shown not only by the evidence of the titrations, but also by the following:

(1) The existence of "inner" complexes of zero charge.
(2) All the compounds are soluble or very soluble in water, giving solutions in some cases having a pH reaction at which aluminum is normally precipitated. This sequestering action and the fact that the solutions are almost completely non-astringent to the oral mucosa, indicate the virtual absence of free aluminum ions.
(3) The absence of free aluminum ions is also indicated by the fact that no precipitates are produced at pH 10 when ammonium chloride and ammonium hydroxide are added to solutions of the compounds at least in the concentration range 0.02 to 0.1 M. Similarly, no precipiates are formed when sodium fluoride is added to solutions of the compounds in the same concentration range.
(4) The alternative possibilities to complex compounds are in a number of cases quite untenable. Thus, the alternatives to the compounds $Na[Al(OH)_2(C_6H_{10}O_7)]$ and $Na_3[Al(C_6H_{10}O_7)_3]$ are mixtures of aluminum hydroxide and sodium gluconate in different proportions.
(5) Cryoscopic estimations of molecular weights support the structures allocated to the compounds.

Cryoscopic tests cannot always give an unequivocal verdict on molecular weights. The purity of the compound, the degree of ionization, the occurrence or otherwise of hydrolysis or depolymerization at the dilution involved, and other factors, can influence the depression of freezing point. A clear indication of the minimum possible molecular weight can be obtained, however. In many cases, the cryoscopic procedure has given support for the formulae adduced for the compounds, and in other cases cryoscopic evidence of hydrolysis and polymerization has been obtained.

In Table 1 are shown some estimations of molecular weights obtained cryoscopically, compared with the expected molecular weights from the formulae proposed. Assay data in comparison with the expected values for the compounds, based on the same formulae, are shown in the same table.

TABLE 1

| Example No. | Moleculer Weight | | Assay | | | | | |
|---|---|---|---|---|---|---|---|---|
| | Expected | Estimated Cryoscopically | Expected | | | Found | | |
| | | | Na, Percent | Al, Percent | $C_6H_{10}O_7$, Percent | Na, Percent | Al, Percent | $C_6H_{10}O_7$, Percent |
| 1 | 1,028.58 | 1,109 | 8.94 | 5.25 | 75.50 | 10.56 | 5.62 | 72.45 |
| 2 | 474.34 | 450.8 | | 5.69 | | | 5.62 | |
| 3 | 988.63 | 920 | | | | | | |
| 5 | 1,166 | 1,225 | 8.01 | 9.40 | 67.61 | 8.39 | 7.8 | 63.2 |
| 6 | 678.37 | 667.2 | 10.17 | 3.97 | 85.86 | 10.43 | 2.82 | 88.4 |

Additional data are given in the examples.

In the light of the titrations and cryoscopic evidence, the structures of the compounds described in the application are considered to be of the following types:

(a) *Monomeric form (1:1 ratio)*

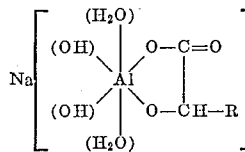

Preferably the hydroxy acid used in preparing the compounds is gluconic acid and R is $C_4H_9O_4$.

(b) *Polymeric form (1:1 ratio)*

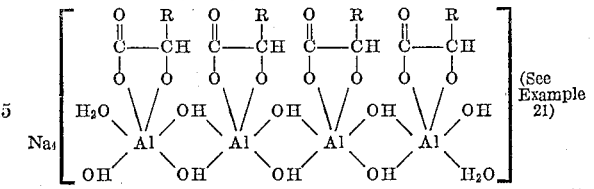

(See Example 21)

In cases where coordination requirements are not fully satisfied by hydroxo groups and a ligand, it is considered that aquo groups are present to saturate the aluminum coordinate covalencies.

However, in assigning formulae to the compounds in the following examples, no rigid assumptions have been made concerning the number of aquo groups. The presence of 8 coordinate aluminum in some cases has been demonstrated by the titrations, but 6 is also recognized as the common coordination requirement of aluminum. Where yield data, assay results or cryoscopic evidence indicates 6 coordinate aluminum in preference to 8 coordinate aluminum this has been accepted.

Following is a description by way of example of methods of carrying the present invention into effect, except for Example 20. The values given in the examples for "Antacid Activity" are determined by the method of Gore, Martin and Taylor, J. Pharm. Pharmacol., 1953, 5, 686–691.

The following examples illustrate the invention:

EXAMPLE 1

*Dimagnesium bis citratodihydroxodialuminate III (basic dimagnesium aluminum citrate)*

This compound was prepared by dissolving 27.26 grams of $Mg_2[Al(OH)_5]_2$ in an aqueous solution containing 19.2 grams of citric acid (anhydrous).

Alternatively, the same compound can be prepared as follows:

Basic aluminum carbonate was prepared by the addition of an aqueous sodium carbonate solution to an aqueous aluminum chloride solution, the precipitate being filtered and well washed.

The basic aluminum carbonate was dissolved in an aqueous citric acid solution in such a proportion as to give one atom of aluminum per mole of citric acid. To this solution was added sufficient basic magnesium carbonate prepared from magnesium chloride solution and sodium carbonate solution, the precipitate having been filtered and well washed, to give one atom of magnesium per atom of aluminum.

The solution was concentrated by evaporation in a water bath until syrupy and crystallization was then effected in a vacuum oven at 23° C.

PROPERTIES

Basic dimagnesium aluminum citrate—

$$Mg_2[Al_2(OH)_2(C_6H_4O_7)_2] \cdot 16H_2O$$

Molecular weight—782.86

|  | Expected, percent | Found, percent |
|---|---|---|
| Mg | 6.07 | 6.13 |
| Al | 6.74 | 6.11 |

Appearance _____ Slightly off-white granules.
Approximate solubility at 25° C. ___ 115% w./v.
pH of 10% solution__ c. 7.0.
Flavor_____ Slightly bitter taste up to 20% solution. Stronger solutions have "brackish" flavor of magnesium salts. Not astringent.

EXAMPLE 2

*Dimagnesium bis citratodihydroxodiferrate III (dimagnesium ferric citrate)*

(a) This compound was prepared from equimolecular amounts of ferric chloride, magnesium chloride and citric acid. An aqueous solution of the mixed chlorides was precipitated with sodium carbonate, the precipitate being filtered and well washed. The precipitate was then dissolved in a solution of the citric acid. The solution was concentrated by evaporation in a water bath until syrupy and crystallization was effected in a vacuum oven at 23° C.
(b) The same compound was prepared by dissolving coprecipitated hydroxides in the stoichiometric amount of citric acid and concentrating and crystallizing as in (a).

PROPERTIES

Dimagnesium ferric citrate—

$$Mg_2[Fe_2^{III}(OH)_2(C_6H_4O_7)_2(H_2O)_6] \cdot 8H_2O$$

Molecular weight—822.71.

The theoretical composition compared with the results of assays is as follows:

|  | Expected | Found (a) | Found (b) |
|---|---|---|---|
| Mg | 5.9 | 5.91 | 6.0 |
| Fe | 13.6 | 12.80 | 13.7 |
| Citrate | 45.7 | | 51 |
| Free water | 17.5 | | 17 |

Appearance_____ Dark red brown scales or granules.
Approximate solubility at 25° C. _____ 50% w./v.
pH of 10% solution_____ c. 6.5.
Flavor of 10% solution___ Almost tasteless. Very faint, not unpleasant after flavor.

This compound is of value as a buffer haematinic material. It has a superior flavor to B.P.C. preparations and is a definite compound. Unlike the B.P.C. preparations its solutions are not astringent. The presence of the laxative magnesium ion helps to prevent the constipating action associated with some iron compounds.

EXAMPLE 3

*Dimagnesium bis citratomagnesate II (tetra-basic magnesium citrate)*

(a) This compound was prepared by a similar procedure to the second method in Example 1 except that basic magnesium carbonate was used throughout, in proportions to give two atoms of magnesium per mole of citric acid. In all cases where basic magnesium carbonate was prepared by adding sodium carbonate solution to a solution of a magnesium salt, the filtrate was heated to precipitate any magnesium bicarbonate formed in solution. This precipitate was washed and dissolved in the citric acid before adding the main bulk of the washed precipitate.

PROPERTIES

Tetra-basic magnesium citrate—

$$Mg_2[Mg_2(C_6H_4O_7)_2] \cdot 2H_2O$$

Molecular weight—833.54

|  | Expected (percent) | Found (percent) |
|---|---|---|
| Mg | 11.67 | 11.73 |

Appearance _____ White crystals.
pH of 1½% solution _____ 9.6.
Flavor _____ Tasteless.

(b) The same compound was prepared from freshly precipitated magnesium hydroxide produced by adding sodium hydroxide to a solution of magnesium chloride in the cold and washing the precipitate with cold water until salt free. The magnesium hydroxide was then dissolved in the stoichiometric amount of citric acid. The solution thus produced was assayed for magnesium and citrate, the molar ratio found being 3.8:2.

EXAMPLE 4

*Trimagnesium bis citratotetrahydroxodiferrate III (trimagnesium ferric citrate)*

This compound was prepared as follows:

(a) An aqueous solution containing ferric and magnesium chlorides in proportions to give two atoms of ferric ion and three atoms of magnesium was precipitated by the addition of sodium carbonate, the precipitate being filtered and well washed. The mixed basic carbonates were then dissolved in an aqueous solution of 2 moles of citric acid. The solution was concentrated by evaporation in a water bath until syrupy and crystallization was then effected in a vacuum oven at 23° C.

PROPERTIES

Trimagnesium ferric citrate—

$$Mg_3[Fe_2^{III}(OH)_4(C_6H_4O_7)_2]$$

Molecular weight (anhydrous) 628.92.
Mg (anhydrous) _____ 11.60%.
Fe (anhydrous) _____ 17.76%.
Appearance _____ Red/brown transparent scales or granules.
Approximate solubility at 25° C. _____ 140% w./v.
pH of 5% solution _____ c. 7.
Flavor _____ Initially tasteless—slight after flavor.

(b) The same compound was made by preparing a coprecipitate by the addition of sodium hydroxide to a solution of magnesium and iron salts in the presence of ammonium chloride, washing this precipitate and dissolving it in the stoichiometric amount of citric acid. The solution was assayed for magnesium, iron and citrate ion, the molar ratios found being as follows:

|  | Mg | Fe | Cit |
|---|---|---|---|
| Found | 10.5 ≡3 | 7.1 2.03 | 7.5 2.14 |
| Expected | 3 | 2 | 2 |

EXAMPLE 5

*Dialuminum bis citratotetrahydroxodialuminate III*
*(tetra-basic aluminum citrate)*

Aluminum hydroxide was prepared by the addition of ammonium hydroxide to an aqueous solution of aluminum chloride to pH 7. The filtered and washed aluminum hydroxide was then dissolved in an aqueous solution of citric acid in proportions to give two atoms of aluminum per mole of citric acid.

PROPERTIES

Tetra-basic aluminum citrate—

$$Al_2[Al_2(OH)_4(C_6H_4O_7)_2] \cdot 10H_2O$$

Molecular weight _____ 732.23.
Al (anhydrous) _____ 19.54%.
Apearance _____ White scales or granules.
pH of 10% solution _____ c. 3.

The expected composition compared with that found by assay is as follows:

|  | Expected (percent) | Found (percent) |
|---|---|---|
| Aluminum | 14.7 | 12.3 |
| Citrate | 51.5 | 54.1 |

EXAMPLE 6

*Magnesium bis citratodialuminate III*
*(magnesium aluminum citrate)*

Aluminum hydroxide was precipitated by the addition of ammonium hydroxide to an aqueous solution of aluminum chloride. The filtered and washed aluminum hydroxide was then dissolved in citric acid in proportions to give two atoms of aluminum to two moles of citric acid. Filtered and washed basic magnesium carbonate, prepared by adding an aqueous sodium carbonate solution to an aqueous solution of magnesium chloride, was then dissolved in the aluminum citrate solution, to give one atom of magnesium to each two atoms of aluminum. The solution was evaporated and crystallized in the same way as for previous examples.

PROPERTIES

Magnesium aluminum citrate ____ $Mg[Al_2(C_6H_4O_7)_2]$.
Molecular weight (anhydrous) ___ 454.54.
Mg (anhydrous) _____ 5.35%.
Al (anhydrous) _____ 11.87%.
Appearance _____ White crystals.
Solubility at 23° C. _____ 50% w./v.
pH of 2% solution _____ 3.35.

EXAMPLE 7

*Dimagnesium bis citratodiferrate II*
*(dimagnesium ferrous citrate)*

(a) An aqueous solution containing magnesium sulfate and ferrous sulfate in proportions to give two atoms of magnesium to two atoms of ferrous iron was precipitated by the addition of an aqueous sodium carbonate solution. The precipitate was washed by decantation, an atmosphere of nitrogen being maintained over the slurry during the washing process, to prevent oxidation of the ferrous iron. The washed precipitate was dissolved in an aqueous solution containing two moles of citric acid and was then evaporated and crystallized.

(b) The same compound was prepared from coprecipitated ferrous-magnesium hydroxides.

PROPERTIES

Dimagnesium ferrous
 citrate _____ $Mg_2[Fe_2^{II}(C_6H_4O_7)_2] \cdot 6H_2O$.
Molecular weight _____ 644.56.

The expected composition in comparison with those found by assay is as follows:

|  | Expected (percent) | Found (a) (percent) | Found (b) (percent) |
|---|---|---|---|
| Mg | 7.5 | 6.0 | 7.0 |
| Fe | 17.4 | 16.8 | 17.0 |
| Citrate | 58.3 | 58 | 58 |
| Water | 16.8 | 13.6 | 9 |

Appearance _____ Olive green crystals.
pH of solution _____ c. 6.0.

EXAMPLE 8

*Tripotassium bis citrato monohydroxo dialuminate III*
*(tripotassium aluminum citrate)*

This compound was prepared by mixing aqueous solutions containing the stoichiometric amounts of aluminum citrate and potassium hydroxide, according to the reaction:

$$2Al(C_6H_5O_7) + 3KOH = K_3[Al_2(OH)(C_6H_4O_7)_2] + 2H_2O$$

The solution obtained was evaporated to dryness in a water bath.

PROPERTIES

Tripotassium aluminum citrate—

$$K_3[Al_2(OH)(C_6H_4O_7)_2]$$

Molecular weight (anhydrous) ____ 525.43.
K (anhydrous) _____ 14.88%.
Al (anhydrous) _____ 10.27%.
Appearance _____ Creamy white transparent scales or granules.
pH of 5% solution _____ 8.5.
Flavor _____ None.
Approximate solubility at 25° C ___ 40%.

EXAMPLE 9

*Tetraammonium bis citrato dihydroxo dialuminate III*
*(tetraammonium aluminum citrate)*

The method of preparation of this compound was similar to that given for Example 8, employing stoichiometric quantities of ammonium hydroxide and aluminum citrate.

PROPERTIES

Tetraammonium aluminum citrate—

$$(NH_4)_4[Al_2(OH)_2Ci_2] \cdot 7H_2O$$

Molecular weight (anhydrous)—662.51

Results of assays of ammonium and citrate ions in comparison with the expected from the above formula were as follows:

|  | Expected (Percent) | Found (Percent) |
|---|---|---|
| NH⁴ | 10.89 | 9.6 |
| Citrate | 56.79 | 63.09 |
| Al | 8.14 |  |

| Appearance | White transparent scales or granules. |
|---|---|
| pH of 2% solution | c. 5. |
| Flavor | Slightly bitter. |
| Approximate solubility at 25° C | 40%. |

EXAMPLE 10

*Tetrasodium bis citrato dimagnesate II*
*(tetrasodium magnesium citrate)*

Magnesium oxide was dissolved in citric acid in the ratio of one atom of magnesium to each mole of citric acid. A solution containing 4 moles of sodium hydroxide was added to the magnesium hydrogen citrate solution and the solution was evaporated to dryness on a water bath.

PROPERTIES

| Tetrasodium magnesium citrate | $Na_4[Mg_2(C_6H_4O_7)_2]$. |
|---|---|
| Molecular weight (anhydrous) | 516.86. |
| Na (anhydrous) | 17.79%. |
| Mg (anhydrous) | 9.41%. |
| Appearance | White granular solid. |
| pH of 10% solution | 10.4. |
| Solubility at 25° C | >10%. |
| Flavor | Very slightly saline. |

EXAMPLE 11

*Disodium magnesium bis citrato dimagnesate II*
*(tetra-basic sodium magnesium citrate)*

This compound was prepared in a similar way to that described for Example 10, using the appropriate stoichiometric amounts of magnesium hydrogen citrate and sodium hydroxide.

PROPERTIES $$Na_2Mg[Mg_2(C_6H_4O_7)_2]$$

| Molecular weight (anhydrous) | 495.20. |
|---|---|
| Na (anhydrous) | 9.29%. |
| Mg (anhydrous) | 14.73%. |
| Appearance | White granular solid. |
| pH of 10% solution | 9.9. |
| Solubility at 25° C | c. 10%. |
| Flavor | Very slightly saline. |

EXAMPLE 12

*Triferrous tetrakis gluconato tetrahydroxodialuminate III*
*(triferrous aluminum gluconate)*

Ferrous sulfate and aluminum chloride were taken in stoichiometric proportions and in the presence of ammonium chloride, sodium hydroxide was added in the cold to form a coprecipitate. The washed precipitate was dissolved in the stoichiometric amount of gluconic acid, dissolution taking several days with occasional agitation. During precipitation and dissolution an atmosphere of nitrogen was maintained in the reaction vessel to avoid oxidation of the ferrous iron. Evaporation was effected in vacuo at 60° C.

PROPERTIES

Triferrous aluminum gluconate—

$$Fe_3^{II}[Al_2(OH)_4(C_4H_{10}O_7)_4] \cdot 13H_2O$$

Molecular weight—1300.4

Results of assays of iron and aluminum in comparison with the expected from the above formula, were as follows:

|  | Expected (Percent) | Found (Percent) |
|---|---|---|
| Fe | 12.88 | 12.31 |
| Al | 4.15 | 4.35 |

| Appearance | Dark green granules. |
|---|---|
| Approximate solubility at 25° C | 6 to 10%. |
| pH of 2% solution | 2.3. |
| Flavor | Slightly acid. |

EXAMPLE 13

*Dimagnesium tetrakis gluconato dihydroxodialuminate III*
*(dimagnesium aluminum gluconate)*

Magnesium oxide was dissolved in gluconic acid solution in the ratio of one atom of Mg to 4 moles of gluconic acid and 2 moles of freshly precipitated aluminum hydroxide were then dissolved in the solution of magnesium gluconate. The solution was evaporated to dryness on a water bath.

PROPERTIES

Dimagnesium aluminum gluconate—

$$Mg_2[Al_2(OH)_2(C_6H_{10}O_7)_4]$$

| Molecular weight (anhydrous) | 913.22. |
|---|---|
| Mg (anhydrous) | 5.33%. |
| Al (anhydrous) | 5.91%. |
| Appearance | White granules. |
| pH of 5% solution | c. 8.0. |
| Solubility at 25° C | c. 10%. |
| Flavor | Bland. |

EXAMPLE 14

*Triferrous bis citrato tetrahydroxodialuminate III*
*(triferrous aluminum citrate)*

This compound was prepared by the "with salts" process and the solution was evaporated to dryness in vacuo at 60° C.

PROPERTIES

Triferrous aluminum citrate $$Fe_3^{III}[Al_2(OH)_4(C_6H_4O_7)_2]$$

| Molecular weight (anhydrous) | 665.8. |
|---|---|
| Fe (anhydrous) | 25.17%. |
| Al (anhydrous) | 8.10%. |
| Appearance | Dark olive green crystals. |
| pH of 10% solution | 6.4. |

EXAMPLE 15

*Dimagnesium bis tartratodihydroxodiferrate III*
*(dimagnesium ferric tartrate)*

This compound was prepared by the "with salts" process and after concentrating on a water bath was evaporated to dryness in vacuo at 60° C.

PROPERTIES

Dimagnesium ferric tartrate—

$$Mg_2[Fe_2^{III}(OH)_2(C_4H_2O_6)_2]$$

| | |
|---|---|
| Molecular weight (anhydrous) | 292.12. |
| Mg (anhydrous) | 16.65%. |
| Fe (anhydrous) | 38.24%. |
| Appearance | Red-brown granular solid. |
| Solubility at 25° C. | c. 0.5%. |
| pH of 0.3% solution | c. 2.5. |

EXAMPLE 16

In addition, the following compounds have been prepared in solution by the "with salts" process:

| | |
|---|---|
| Magnesium bis tartrato diferrate III | $Mg[Fe_2^{III}(C_4H_2O_6)_2]$ |
| Trimagnesium bis tartratotetrahydroxodiferrate III | $Mg_3[Fe_2^{III}(OH)_4(C_4H_2O_6)_2]$ |
| Magnesium bis lactato magnesate II | $Mg[Mg(C_3H_4O_3)_2]$ |
| Diferric bis tartratotetrahydroxodiferrate III | $Fe_2^{III}[Fe_2^{III}(OH)_4(C_4H_2O_6)_2]$ |
| Ferric bis lactatodihydroxoferrate III | $Fe^{III}[Fe^{III}(OH)_2(C_3H_4O_3)_2]$ |
| Magnesium bis citratodiferrate III | $Mg[Fe_2^{III}(C_6H_4O_7)_2]$ |
| Magnesium bis gluconatotetrahydroxodiferrate III | $Mg[Fe_2^{III}(OH)_4(C_6H_{10}O_7)_2]$ |
| Magnesium tetrakis gluconatodiferrate III | $Mg[Fe_2^{III}(C_6H_{10}O_7)_4]$ |
| Dimagnesium tetrakis gluconatodihydroxodiferrate III | $Mg_2[Fe_2^{III}(OH)_2(C_6H_{10}O_7)_4]$ |
| Dimagnesium bis gluconato hexahydroxodiferrate III | $Mg_2[Fe_2^{III}(OH)_6(C_6H_{10}O_7)_2]$ |
| Trimagnesium tetrakis gluconatotetrahydroxodiferrate III | $Mg_3[Fe_2^{III}(OH)_4(C_6H_{10}O_7)_4]$ |
| Dimagnesium tetrakis gluconatodimagnesate II | $Mg_2[Mg_2(C_6H_{10}O_7)_4]$ |
| Diferric tetrakis gluconatotetrahydroxodiferrate III | $Fe_2^{III}[Fe_2^{III}(OH)_4(C_6H_{10}O_7)_4]$ |
| Trimagnesium bis citrato tetrahydroxodialuminate III | $Mg_3[Al_2(OH)_4(C_6H_4O_7)_2]$ |
| Magnesium tetrakis gluconato dialuminate III | $Mg[Al_2(C_6H_{10}O_7)_4]$ |
| Dialuminum tetrakis gluconato tetrahydroxodialuminate III | $Al_2[Al_2(OH)_4(C_6H_{10}O_7)_4]$ |
| Dimagnesium bis tartratodimagnesate II | $Mg_2[Mg_2(C_4H_2O_6)_2]$ |
| Ferrous bis citrato dialuminate III | $Fe^{II}[Al_2(C_6H_4O_7)_2]$ |
| Diferrous bis citratodihydroxodialuminate III | $Fe_2^{II}[Al_2(OH)_2(C_6H_4O_7)_2]$ |
| Tetraferrous bis citratohexahydroxodialuminate III | $Fe_4^{II}[Al_2(OH)_6(C_6H_4O_7)_2]$ |
| Pentaferrous bis citratooctahydroxodialuminate III | $Fe_5^{II}[Al_2(OH)_8(C_6H_4O_7)_2]$ |
| Diferrous bis citratodiferrate II | $Fe_2^{II}[Fe_2^{II}(C_6H_4O_7)_2]$ |
| Ferrous tetrakis gluconato dialuminate III | $Fe^{II}[Al_2(C_6H_{10}O_7)_4]$ |
| Diferrous tetrakis gluconato dihydroxodialuminate III | $Fe_2^{II}[Al_2(OH)_2(C_6H_{10}O_7)_4]$ |
| Tetraferrous tetrakis gluconato hexahydroxodialuminate III | $Fe_4^{II}[Al_2(OH)_6(C_6H_{10}O_7)_4]$ |
| Ferrous bis tartratodialuminate III | $Fe^{II}[Al_2(C_4H_2O_6)_2]$ |
| Diferrous bis tartratodihydroxodialuminate III | $Fe_2^{II}[Al_2(OH)_2(C_4H_2O_6)_2]$ |
| Triferrous bis tartratotetrahydroxodialuminate III | $Fe_3^{II}[Al_2(OH)_4(C_4H_2O_6)_2]$ |
| Tetraferrous bis tartratohexahydroxodialuminate III | $Fe_4^{II}[Al_2(OH)_6(C_4H_2O_6)_2]$ |
| Ferrous tetrakis lactatodialuminate III | $Fe^{II}[Al_2(C_3H_4O_3)_4]$ |
| Ferrous bis gluconatotetrahydroxodiferrate III | $Fe^{II}[Fe_2^{III}(OH)_4(C_6H_{10}O_7)_2]$ |
| Diferrous bis gluconatohexahydroxodiferrate III | $Fe_2^{II}[Fe_2^{III}(OH)_6(C_6H_{10}O_7)_2]$ |
| Tetraferrous tetrakis gluconatohexahydroxodiferrate III | $Fe_4^{II}[Fe_2^{III}(OH)_6(C_6H_{10}O_7)_4]$ |
| Diferrous tetrakis gluconato diferrate II | $Fe_2^{II}[Fe_2^{II}(C_6H_{10}O_7)_4]$ |
| Diferric tetrakis gluconatotetrahydroxodiferrate III | $Fe_2^{III}[Fe_2^{III}(OH)_4(C_6H_{10}O_7)_4]$ |
| Ferrous bis citratodiferrate III | $Fe^{II}[Fe_2^{III}(C_6H_4O_7)_2]$ |
| Pentaferrous bis citratooctahydroxodiferrate III | $Fe_5^{II}[Fe_2^{III}(OH)_8(C_6H_4O_7)_2]$ |
| Diferric bis citratotetrahydroxodiferrate III | $Fe^{III}[Fe_2^{III}(OH)_4(C_6H_4O_7)_2]$ |
| Diferrous tetrakis lactatodiferrate II | $Fe_2^{II}[Fe_2^{II}(C_3H_4O_3)_4]$ |
| Diferric tetrakis lactatotetrahydroxodiferrate III | $Fe_2^{III}[Fe_2^{III}(OH)_4(C_3H_4O_3)_4]$ |
| Ferrous bis tartratodiferrate III | $Fe^{II}[Fe_2^{III}(C_4H_2O_6)_2]$ |
| Tetraferrous bis tartratohexahydroxodiferrate III | $Fe_4^{II}[Fe_2^{III}(OH)_6(C_4H_2O_6)_2]$ |
| Diferrous bis tartratodiferrate II | $Fe_2^{II}[Fe_2^{II}(C_4H_2O_6)_2]$ |
| Diferric bis tartratoetrahydroxodiferrate III | $Fe_2^{III}[Fe_2^{III}(OH)_4(C_4H_2O_6)_2]$ |

EXAMPLE 17

*Preparation of tetrasodium tetrakisgluconatodihydroxodialuminate III (tetrasodium aluminum tetragluconate)*

Materials were used in the following proportions:

One g.-mole $Al(OH)_3$, freshly prepared
Two g.-moles glucono-delta-lactone
Two g.-moles sodium hydroxide.

Aluminum hydroxide gel was precipitated by the addition of ammonium hydroxide to an aqueous solution of aluminum chloride. The filtered and washed aluminum hydroxide was then dissolved in a solution of gluconic acid prepared by the hydrolysis of glucono-delta-lactone. Dissolution was accelerated by warming, being quite rapid at temperatures above 45° C. The sodium hydroxide was then added as a 25 percent solution and after filtration the solution was concentrated to a syrup on a water bath and dried in a vacuum oven at 80° C.

PROPERTIES $$Na_4[Al_2^{III}(OH)_2(H_2O)_4(C_6H_{10}O_7)_4]$$

| | |
|---|---|
| Molecular weight | 1028.58. |
| Antacid activity | Peak pH 5.5 Extension N HCl (2 g.). |
| Appearance | Creamy white non-crystalline solid. |
| Approximate solubility at 25° C. | 80% w./v. |
| pH of 30% w./v. solution | 9.8. |

EXAMPLE 18

*Preparation of sodium bis gluconatoaluminate III (sodium aluminum gluconate)*

This compound was prepared by a similar method to that described in Example 1, materials being used in the following proportions:

One g.=mole $Al(OH)_3$
Two g.=moles gluconic acid
One g.=mole sodium hydroxide

PROPERTIES $$Na[Al^{III}(H_2O)_2(C_6H_{10}O_7)_2]$$

| | |
|---|---|
| Molecular weight | 474.34. |
| Na | 4.85%. |
| Al | 5.69%. |
| Appearance | Off-white non-crystalline solid. |
| pH of 20% solution | 5.2. |
| Solubility at 25° C. | >80% w./v. |

The high solubility material prepared as described in Example 1 enables an effective dose of antacid to be incorporated in a reasonable bulk of liquid antacid (one teaspoonful=4 ml.). The pH of the strong solution is greater than desirable, however, so that under conditions of overdosage, the gastric contents could be made unduly alkaline. On the other hand, the pH of material prepared as described in Example 2 is lower than the optimum. In Example 3, the preparation is decribed of material of intermediate composition.

EXAMPLE 19

(a) Materials were taken in the following proportions:

One g.=mole $(Al(OH)_3)$
Two g.=moles gluconic acid
1½ g.=moles sodium hydroxide The method of preparation was the same as described in Examples 1 and 2.

The proportions taken correspond to the formula:

$$Na_3[Al_2(OH)(C_6H_{10}O_7)_4]$$

but the existance of this compound is considered improbable on structural grounds, as the formula indicates a dimeric anion without the required bridging hydroxo groups. The possibility of glucono ion bridging seems less likely.

The gram "molar" quantity in accordance with the above formula is regarded as comprising 1 g.=mole of $$Na[Al^{III}(H_2O)_2(C_6H_{10}O_7)_2]$$

plus ½ g.=mole of $$Na_4[Al_2^{III}(OH)_2(H_2O)_4(C_6H_{10}O_7)_4]$$

and the solution would contain a greater number of ions (in the ratio 4½:4), compared with a grand molecular of composition $Na_3[Al_2(OH)(H_2O)_4(C_6H_{10}O_7)_4]$.

The apparent molecular weight determined by a cryoscopic method on the assumptions given supports the mixture of two compounds.

Observed average gram ionic weight=245
Average molecular weight (4 ions)=818
Average molecular weight (4½ ions)=920
$Na_3[Al_2(OH)(H_2O)_4(C_6H_{10}O_7)_4]=988.6$

PROPERTIES

Appearance—creamy white non-crystalline substance
Solubility at 25° C.—>80% w./v.
pH of 30% w./v. solution—6.8
Antacid activity—13 ml. N HCl for 2 g.

(b) The same material was prepared by a different method as follows:

MATERIALS USED

Aluminum foil (>99% pure)—58.9 g.
Sodium hydroxide—131 g.
Gluconic acid—858 g.

A solution of sodium aluminate was prepared by dissolving portions of the aluminum foil in the sodium hydroxide taken as a 40 percent solution. When all the aluminum had been dissolved, the solution was filtered into the gluconic acid, which was present as a 50 percent w./v. solution. The solution was concentrated by evaporation on a water bath and dried in a vacuum oven at 80° C.

EXAMPLE 20

*Preparation of gluconatohydroxoaluminum III*

Materials were taken in the following proportions:
One g.=mole $Al(OH)_3$, freshly prepared
One g-mole gluconic acid.

Aluminum hydroxide was prepared from aluminum chloride and ammonium hydroxide as described in Example 1. The aluminum hydroxide was then dissolved in gluconic acid with the aid of heat. The solution was concentrated by evaporation on a water bath and dried in a vacuum oven at 50° C.

PROPERTIES $[Al(OH)(C_6H_{10}O_7)]^0$

Molecular weight—238.13

| Assay | Al, percent | $C_6H_{10}O_7$, percent |
|---|---|---|
| Expected | 11.33 | 81.53 |
| Observed | 10.0 | 79.38 | pH of 10% w./v. solution—c. 3.7
Appearance—creamy white non-crystalline solid
Solubility at 25° C.—>60% w./v.

The chelate of the above composition is regarded as an inner-complex of zero charge. Both ion-exchange resin studies and cryoscopic investigations showed the presence of an un-ionized compound. It was also indicated that significant amounts of ionized material were present. Thus, when a solution of the compound was passed firstly through a cationic exchange resin (H form) and then through an anionic exchange column, approximately 50 percent of the compound was recovered in the effluent from the second column, and the same proportion of aluminum was recovered from the cationic-exchange column when the latter was treated with sodium hydroxide. Again, the cryoscopic result indicated 78 percent ionization, but the degree of ionization could well be different according to the extent of dilution and the age of the sample. Ionization of such a compound could only arise as a result of hydrolysis according to the reaction:

$[Al(OH)(C_6H_{10}O_7)]^0 + 5H_2O \rightleftharpoons$
$[Al(H_2O)_4(OH)_2]^+ + (C_6H_{11}O_7)^-$ Other evidence of hydrolysis of some of the compounds has been noted. In the potentiometric titration for the 1:1 ratio of gluconic acid to aluminum, it was observed that below a certain dilution some precipitation (cloudiness) occurred in the pH range 5 to 8.5. When using 0.1 M solutions of aluminum and gluconic acid, it was found that if the extent of dilution did not exceed three times as much water as gluconic acid, no cloudiness occurred during the titrations. At lower concentrations evidence of hydrolysis was obtained.

The present compound has a pH of approximately 3.7 in 10 percent solution, and the inflection corresponding to its formation occurs at below pH 5. No precipitation was observed in this range during titrations, the implication being that the products of hydrolysis are soluble ions, as indicated by the equation above. At higher pH values the products of hydrolysis would include insoluble aluminum hydroxide.

EXAMPLE 21

*Preparation of sodium gluconatodihydroxoaluminate III*

While this compound may be prepared by dissolving 1 g.-mole of freshly prepared aluminum hydroxide gel in 1 g.-mole of gluconic acid and adding the appropriate amount of sodium hydroxide, it was found expedient to deal with only half the aluminum in this way, preparing the remainder of the aluminum as sodium aluminate.

MATERIALS USED (i) $AlCl_3 6H_2O$—70.0 ml. of 72.3% w./v. solution
    Gluconic acid—131.4 ml. of 62.6% w./v. solution
(ii) Aluminum foil—5.68 g.
     Sodium hydroxide—16.82 g.

Aluminum hydroxide was precipitated from the aluminum chloride solution by using ammonium hydroxide. The washed and filtered aluminum hydroxide was then dissolved in the gluconic acid solution. A sodium aluminate solution was prepared from the aluminum foil and sodium hydroxide, and this solution was filtered into the solution of aluminum hydroxide in gluconic acid. The solution was concentrated to a syrup and then dried in a vacuum oven.

PROPERTIES $Na[Al(OH)_2(H_2O)_2(C_6H_{10}O_7)]$

Molecular weight—314.19

| Assay | Na | Al | $C_6H_{10}O_7$ |
|---|---|---|---|
| Expected, percent | 7.32 | 8.59 | 61.75 |
| Found, percent | 8.39 | 7.8 | 63.15 |

Appearance—Off-white non-crystalline solid
Solubility at 25° C.—>80% w./v.
pH of 30% w./v. solution—8.5
Antacid activity—7.5 ml. N HCl per g.

The activity curve is reproduced in the accompanying drawing.

The formula given above is in monomeric form. The cryoscopic estimate of molecular weight for this compound, however, suggested some degree of polymerization. That polymerization occurs with many of the compounds is suggested by the high viscosity of their concentrated solutions. The well-known phenomenon of polymerization by olation has already been referred to. The occurrence and degree of polymerization is likely to be greater with the lower ratio of metal to acid as fewer readily replaceable coordination sites are available with higher ratios of acid to metal. The cryoscopic result supports a formula as follows:

$Na_4[Al_4(OH)_8(H_2O)_2(C_6H_{10}O_7)_4]$

Molecular weight:
  Expected—1166
  Found—1225

EXAMPLE 22

*Preparation of trisodium trisgluconatoaluminate III*

MATERIALS USED 4.77 grams of dry sodium aluminate in which the molar ratio $Na_2O/Al_2O_3=1.24$
3.53 grams sodium hydroxide
29.4 grams gluconic acid.

The sodium aluminate was dissolved to make a 25 percent w./v. solution and the sodium hydroxide was added as a 40 percent w./v. solution. The gluconic acid was taken as a 60 percent w./v. solution and the sodium aluminate solution was filtered into the latter. The solution was then concentrated by evaporation and dried in a vacuum oven.

PROPERTIES $Na_3[Al(C_6H_{10}O_7)_3]$

Molecular weight—678.37
Appearance—off-white non-crystalline substance
Solubility at 25° C.—>80% w./v.
pH of 20% w./v. solution—10.1
Antacid activity—peak pH 5.1. Extension 12 ml. N HCl (2 g.)

EXAMPLE 23

*Preparation of an antacid material*

MATERIALS USED

| | Kg. |
|---|---|
| Aluminum foil | 0.878 |
| Sodium hydroxide | 1.564 |
| Gluconic acid | 1.92 |
| Lactic acid | 3.26 |

A solution of sodium aluminate was prepared by dissolving the aluminum foil in a 40 percent w./v. solution of the sodium hydroxide. The sodium aluminate solution was filtered into one liter of a 50 percent w./v. solution of gluconic acid. The remaining gluconic acid was mixed with the lactic acid and the mixed acids were added slowly to the sodium aluminate solution with continuous stirring. Water was added to adjust the concentration of the compound to 50 percent w./v., and sugar, flavoring material and coloring matter were added to the solution.

ANTACID ACTIVITY

One teaspoonful dose (4 ml.) of the preparation containing 2 g. of the active compound neutralized 16 ml. of N HCl to pH 3, the pH at no time exceeding 5 (test of Gore, Martin and Taylor, modified).

The composition of the active substance in the preparation was regarded as comprising a 4:1 (molar) mixture of $Na[Al(OH)_2A]$ and $Na_2[Al(OH)A_2]$ plus 20 percent additional "A," where "A" is a 3.75:1 molar mixture of lactic and gluconic acids.

EXAMPLE 24

*Preparation of an antacid composition employing commercially available sodium aluminate*

57.3 grams of a commercially available dry sodium aluminate, in which the molar ratio $Na_2O/Al_2O_3=1.24$, was dissolved in water to give a 50 percent w./v. solution. This solution of sodium aluminate was filtered into 46.44 grams of gluconic acid taken as a 50 percent w./v. solution. To this was added 78.61 grams of lactic acid, taken as an 88 percent solution. This addition was made slowly with constant stirring. Finally, water was added to adjust the concentration of the compound to 41 percent w./v., and sugar, flavoring material and coloring matter were added to the solution.

ANTACID ACTIVITY

A teaspoonful dose (4 ml.) of the preparation containing about 1.6 g. of compound neutralized 15 ml. of N HCl to pH 3.

The composition of the active substance in this preparation is regarded as being a 3.17:1 (molar) mixture of $Na[Al(OH)_2A]$ and $Na_2[Al(OH)A_2]$ plus 48 percent additional "A," where "A" is a 3.65:1 molar mixture of lactic acid and gluconic acid.

EXAMPLE 25

*Preparation of a sodium aluminum lactate*

MATERIALS USED

Dry sodium aluminate ($Na_2O/Al_2O_3$ ratio=1.24)—191 g.
Lactic acid—361 g.

The sodium aluminate was prepared as a 10 percent w./v. solution (it was found to be important in the preparation of the lactato compound to avoid the use of concentrated solutions of sodium aluminate) and this was added slowly with continuous stirring to the lactic acid taken as an 88 percent solution. The solution was concentrated on a water bath and dried in a vacuum oven at 80° C.

PROPERTIES

The materials taken correspond to a composition:

$$Na_{1.24}[Al(OH)_{0.24}(C_3H_4O_3)_2]$$

which is regarded as being a 3.17:1 (molar) mixture of:

$$Na[Al(C_3H_4O_3)_2] \text{ and } Na_2[Al(OH)(C_3H_4O_3)_2]$$

| Assay | Al, percent | $C_3H_4O_3$, percent |
|---|---|---|
| Expected (2H$_2$O) | 9.8 | 65.3 |
| Found | 8.7 | 71.5 |

Appearance—An off-white non-crystalline solid
Solubility at 25° C.—c. 75% w./v.
pH of 10 w./v. solution—7.3
Antacid activity—2 g. of compound neutralized 13 ml. of N HCl to pH 3.

EXAMPLE 26

*Preparation of a sodium aluminum citrate*

It was found to be important in preparing the sodium citrato aluminates to avoid mixing solutions of a higher concentration than about 15 percent w./v.

MATERIALS USED

Dry sodium aluminate (ratio $Na_2O/Al_2O_3=1.24$)—22.8 g.
Citric acid monohydrate—25 g.

The materials were dissolved in water to give 15 percent w./v. solutions and the sodium aluminate solution was filtered into the solution of citric acid. The material was then concentrated by evaporation and dried in a vacuum oven at 80° C.

PROPERTIES

The quantities of materials taken correspond to a composition:

$$Na_{2.48}[Al_2(OH)_{4.48}(C_6H_4O_7)]$$

which is regarded as being a mixture of 1.08 mole $Na_2[Al_2(OH)_4(C_6H_4O_7)]$ and 1 mole of $$Na_3[Al_2(OH)_5(C_6H_4O_7)]$$

Appearance—off-white non-crystalline solid
Antacid activity—2 g. neutralizes 6 ml. N HCl to pH 3 or 27 ml. N HCl to pH 2.

EXAMPLE 27

*Preparation of trisodium bistartratohydroxodialuminate III*

In preparing the sodium tartratoaluminates, it was found to be important to use dilute solutions of about 4 percent w./v.

MATERIALS USED

| | G. |
|---|---|
| Aluminum wire (99% purity) | 2.7 |
| Sodium hydroxide | 6 |
| Tartaric acid | 15 |

The aluminum was dissolved in the sodium hydroxide taken as a 40 percent w./v. solution. When dissolution was complete, the solution of sodium aluminate was filtered and diluted to make a 4 percent w./v. solution. This solution was added to the tartaric acid taken as a 4 percent w./v. solution. The solution was concentrated by evaporation and dried in a vacuum oven at 80° C.

PROPERTIES $Na_3[Al_2(OH)(C_4H_2O_6)_2]$

Molecular weight—431.97
Appearance—off-white non-crystalline solid
Solubility at 25° C.—An 80% w./v. solution of high viscosity is possible.
pH of 10% w./v. solution—8.5
Antacid activity—1.5 g. neutralizes 10 ml. N HCl to pH 3. Peak pH 5.8.

EXAMPLE 28

*Preparation of pentasodium tetrakisgluconatoaluminate III*

MATERIALS USED 95.5 g. of dry sodium aluminate in which the molar ratio $Na_2O:Al_2O_3=1.24$
150.4 g. sodium hydroxide
712 g. glucono-delta-lactone.

PROCESS

The sodium aluminate was dissolved in hot water to give a 50 percent w./v. solution. Meanwhile, the glucono-delta-lactone was dissolved in water to prepare by hydrolysis an approximately 60 percent solution of gluconic acid. The filtered sodium aluminate solution was added to the solution of gluconic acid and finally the sodium hydroxide taken as a 40 percent w./v. solution was added slowly. The solution was concentrated to about 80 percent w./v. and further drying was carried out at 40° C. under vacuum.

PROPERTIES $Na_5[Al(C_6H_{10}O_7)_4]$

Molecular weight—918.52
Molecular weight determined cryoscopically—(a) 1000, (b) 870
Appearance—Non-crystalline material
Solubility at 25° C.—>80% w./v.
pH of 60% w./v. solution at 25° C.—12.2.

EXAMPLE 29

*Preparation of sodium gluconatodihydroxoaluminate III*

MATERIALS USED

|  | G. |
|---|---|
| Aluminum isopropoxide | 204.23 |
| Sodium hydroxide | 40.00 |
| Glucono-delta-lactone | 178.15 |

The glucono-delta-lactone was dissolved in 200 ml. of water with the aid of a little heat. The sodium hydroxide was dissolved in 150 ml. of water and this solution was added slowly to the solution of gluconic acid with continuous rapid stirring. Then the aluminum isopropoxide (30 mesh) was added slowly with stirring until it had dissolved. The mixture was concentrated to a syrup on a water bath and dried in vacuo at 60° C.

PROPERTIES $Na[Al(OH)_2(H_2O)_2C_6H_{10}O_7]$

Molecular weight—314.19
Appearance—an odorless, off-white, non-crystalline solid of bland flavor
Solubility in water at 25° C.—>80% w./v.
Insoluble in anhydrous alcohol, ether and chloroform
pH of a 30% w./v. solution—8.5

Acid neutralizing capacity—when 1 g. was digested with 10 ml. N HCl on a water bath for 1 hour, the pH was raised to >3.

EXAMPLE 30

*Preparation of potassium gluconatodihydroxoaluminate III*

MATERIALS USED

|  | G. |
|---|---|
| Aluminum isopropoxide | 204.23 |
| Potassium hydroxide | 56.11 |
| Glucono-delta-lactone | 178.15 |

The glucono-delta-lactone was dissolved in 350 ml. of water with the aid of a little heat. Small additions of aluminum isopropoxide (30 mesh) were made to the gluconic acid solution allowing each portion to dissolve before adding more. The potassium hydroxide was dissolved in 150 ml. of water and this solution was added slowly to the solution of aluminum isopropoxide and gluconic acid. After filtration, the solution was concentrated on a boiling water bath and finally dried in vacuo at 60° C.

PROPERTIES $K[Al(OH)_2C_6H_{10}O_7]$

Molecular weight—292.24
Appearance—an odorless, slightly off-white, granular solid of bland flavor
Solubility in water at 25° C.—80 w./v.
pH of a 30% w./v. solution—9.9
Acid neutralizing capacity—when 1 gram was digested in a 200 ml. pool containing 10 ml. N HCl on a boiling water bath for 1 hour, the pH was raised to >3.

What is claimed is:
1. A chelate of the formula:

$$M_x[M'_y(AO)_z(OH)_{1x+y(m-2z)}(H_2O)_v]_n$$

wherein M is selected from the group consisting of magnesium, aluminum, iron, sodium, potassium and the ammonium radical, M' is selected from the group consisting of magnesium, aluminum and iron, AO is selected from the group consisting of the bidentate ions formed from the monocarboxylic α-hydroxy acids of the formula:

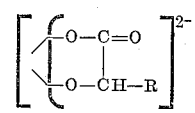

in which R is one of the groups

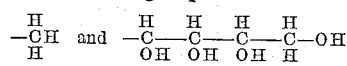

and the tetradentate ions formed from tartaric and citric acids of the respective formulae:

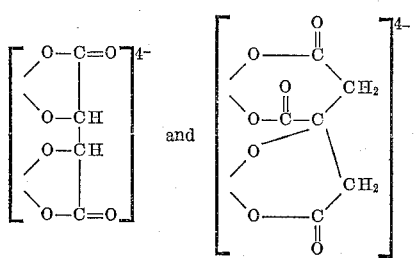

$x$ is an integer from 1 to 5 inclusive, $y$ is unity for bidentate ions and 2 for tetradentate ions, $z$ is an integer from 1 to 4 inclusive, $n$ is 2 for bidentate ions when the valency of M is greater than 1 and is unity in all other cases, $l$ is the valency of M divided by $n$, $m$ is the valency of M' and $v$ is an integer from 0 to 6 inclusive with the proviso that when M and M' are the same metal then $z$ is not less than $y$.

2. Magnesium gluconato aluminates III of the formula:

$$Mg_n[Al(OH)_{n-1}(C_6H_{10}O_7)_2]_2$$

where $n$ is an integer from 1 to 5.

3. Chelates of the formula:

$$M_x[Al_y(AO)_z(OH)_{x+y(3-2z)}(H_2O)_v]$$

wherein M is selected from the group consisting of sodium and potassium, AO is selected from the group consisting of the bidentate ions formed from the monocarboxylic α-hydroxy acids of the formula:

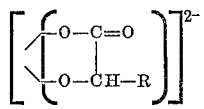

in which R is one of the groups

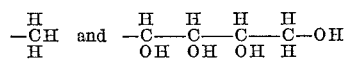

and the tetradentate ions formed from tartaric and citric acids of the respective formulae:

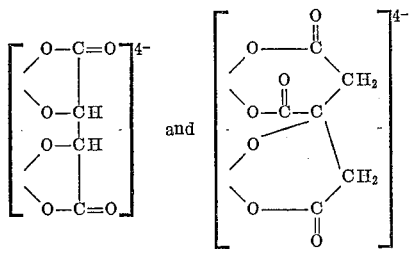

$x$ is an integer from 1 to 5 inclusive, $y$ is unity for bidentate ions and 2 for tetradentate ions, $z$ is an integer from 1 to 4 inclusive, $n$ is 2 for bidentate ions when the valency of M is greater than 1 and is unity in all other cases, $l$ is the valency of M divided by $n$, $m$ is the valency of M' and $v$ is an integer from 0 to 6 inclusive, and polymeric forms thereof.

4. Tetrasodium tetrakisgluconatodihydroxodialuminate III.
5. Sodium bisgluconatoaluminate III.
6. Sodium gluconatodihydroxoaluminate III.
7. Potassium gluconatodihydroxoaluminate III.
8. Trisodium trisgluconatoaluminate III.
9. Sodium aluminum lactate.
10. Sodium aluminum citrate.
11. Trisodium bistartratohydroxodialuminate III.
12. Pentasodium tetrakisgluconatoaluminate III.
13. Magnesium citrato aluminates of the formula:

$$Mg_n[Al_2(OH)_{2n-2}.Ci_2]$$

where Ci is the citrato ion in chelated form and $n$ is an integer from 1 to 5 inclusive.

14. Magnesium citrato ferrates of the formula:

$$Mg_n[Fe_2^{III}(OH)_{2n-2}.Ci_2]$$

where Ci is the citrato ion in chelated form and $n$ is an integer from 1 to 5 inclusive.

15. Dimagnesium bis citratodimagnesium II of the formula:

$$Mg_2[Mg_2Ci_2]$$

where Ci is the citrato ion in chelated form.

16. Dimagnesium bis citratoferrate II of the formula:

$$Mg_2[Fe_2Ci_2]$$

where Ci is the citrato ion in chelated form.

17. A process for the preparation of a chelate of claim 1 wherein M' is iron, which comprises forming alkali metal hydroxoferrate, adding thereto a solution of the salt of the cation metal to precipitate the required ferrate and thereafter dissolving the precipitate in an α-hydroxy acid selected from the group consisting of citric, tartaric, lactic and gluconic acid ions.

18. In a process for preparing a chelate of claim 1, the steps which comprise forming a co-precipitate by reacting a mixture of salts of at least two of the metals M with a compound selected from the group consisting of sodium hydroxide and sodium carbonate and dissolving the co-precipitate in an α-hydroxy acid selected from the group consisting of citric, tartaric, lactic and gluconic acids providing chelated α-hydroxy acid ions.

19. A process according to claim 18 wherein a compound selected from the group consisting of ammonium hydroxide and ammonium chloride is present in the reaction mixture.

20. A process according to claim 18 wherein the α-hydroxy acid is citric acid.

21. A process according to claim 17 wherein the α-hydroxy acid is citric acid.

References Cited by the Examiner

UNITED STATES PATENTS

| | | | |
|---|---|---|---|
| 1,846,880 | 2/32 | Kussmaul | 260—448 |
| 2,042,019 | 5/36 | Pasternack et al. | 260—448 |
| 2,327,815 | 8/43 | Niedercorn et al. | 260—448 |
| 2,691,667 | 10/54 | Opfermann | 260—439 |
| 3,047,602 | 7/62 | Schenck | 260—448 |
| 3,091,626 | 5/63 | Carlson | 260—439 |

FOREIGN PATENTS

| | | |
|---|---|---|
| 531,682 | 10/56 | Canada. |
| 540,326 | 12/31 | Germany. |
| 503,212 | 6/37 | Great Britain. |

OTHER REFERENCES

Pickering: J. Chem. Soc. (London), volume 109T, pages 235–249 (1916).

TOBIAS E. LEVOW, *Primary Examiner.*